(12) United States Patent
Kim et al.

(10) Patent No.: US 10,095,085 B2
(45) Date of Patent: Oct. 9, 2018

(54) MOBILE TERMINAL

(71) Applicant: LG ELECTRONICS INC., Seoul (KR)

(72) Inventors: Jongpil Kim, Seoul (KR); Yongho Lee, Seoul (KR); Gunseek Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/414,429

(22) Filed: Jan. 24, 2017

(65) Prior Publication Data

US 2017/0357144 A1 Dec. 14, 2017

(30) Foreign Application Priority Data

Jun. 10, 2016 (KR) .................. 10-2016-0072687

(51) Int. Cl.
| | |
|---|---|
| *G03B 9/06* | (2006.01) |
| *G03B 11/00* | (2006.01) |
| *G03B 17/12* | (2006.01) |
| *H04M 1/02* | (2006.01) |

(52) U.S. Cl.
CPC .............. *G03B 9/06* (2013.01); *G03B 11/00* (2013.01); *G03B 17/12* (2013.01); *H04M 1/0264* (2013.01)

(58) Field of Classification Search
CPC .......... G03B 9/06; G03B 11/00; G03B 17/12; H04M 1/0264
See application file for complete search history.

(56) References Cited

U.S. PATENT DOCUMENTS

| | | |
|---|---|---|
| 2007/0098398 A1 | 5/2007 | Hagiwara et al. |
| 2009/0015706 A1 | 1/2009 | Singh |
| 2009/0052886 A1 | 2/2009 | Watanabe et al. |
| 2012/0189293 A1* | 7/2012 | Cao .......................... G03B 9/02 396/333 |
| 2014/0022655 A1 | 1/2014 | Cheng et al. |
| 2016/0044232 A1 | 2/2016 | Kim et al. |

FOREIGN PATENT DOCUMENTS

KR 20060118788 11/2006

OTHER PUBLICATIONS

European Patent Office Application Serial No. 17000131.7, Search Report dated Sep. 11, 2017, 11 pages.

\* cited by examiner

*Primary Examiner* — Twyler Haskins
*Assistant Examiner* — Fayez Bhuiyan
(74) *Attorney, Agent, or Firm* — Lee, Hong, Degerman, Kang & Waimey

(57) ABSTRACT

A mobile terminal includes: a terminal body; and a camera module provided at one side of the terminal body, wherein the camera module includes: a first lens assembly; a second lens assembly provided below the first lens assembly; a diaphragm disposed between the first and second lens assemblies, and having its aperture changed; and an actuator disposed close to the first lens assembly, and configured to reciprocate the first lens assembly, wherein the diaphragm includes: a first blade having a through hole therein; a second blade having a through hole therein, and configured to change an aperture of the diaphragm by a relative motion with respect to the first blade; a link member coupled to end parts of the first and second blades, and configured to move the first and second blades by being rotated; and a motor coupled to one side of the link member, and configured to rotate the link member.

11 Claims, 12 Drawing Sheets

MOBILE TERMINAL

CROSS-REFERENCE TO RELATED APPLICATION

Pursuant to 35 U.S.C. § 119(a), this application claims the benefit of earlier filing date of and right of priority to Korean Application No. 10-2016-0072687, filed on Jun. 10, 2016, the contents of which are all hereby incorporated by reference herein in its entirety.

BACKGROUND OF THE INVENTION

1. Field of the Invention

This specification relates to a mobile terminal having a camera module provided with two lens assemblies.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

Unlike a general camera, a camera module mounted to the mobile terminal is not provided with a function to change an aperture of a diaphragm. That is, the camera module mounted to the mobile terminal is formed to have a fixed aperture, not a changeable aperture.

In this case, an electric motor may be used to change the aperture. In case of using the electric motor, it should be determined whether to move the electric motor when an auto focusing (AF) function is executed by a weight of the electric motor.

SUMMARY OF THE INVENTION

Therefore, an aspect of the detailed description is to provide a camera module capable of executing an auto focusing (AF) function with changing an aperture of a diaphragm.

To achieve these and other advantages and in accordance with the purpose of this specification, as embodied and broadly described herein, there is provided a mobile terminal, including: a terminal body; and a camera module provided at one side of the terminal body, wherein the camera module includes: a first lens assembly; a second lens assembly provided below the first lens assembly; a diaphragm disposed between the first and second lens assemblies, and having its aperture changed; and an actuator disposed close to the first lens assembly, and configured to reciprocate the first lens assembly, wherein the diaphragm includes: a first blade having a through hole therein; a second blade having a through hole therein, and configured to change an aperture of the diaphragm by a relative motion with respect to the first blade; a link member coupled to end parts of the first and second blades, and configured to move the first and second blades by being rotated; and a motor coupled to one side of the link member, and configured to rotate the link member.

In an embodiment of the present invention, the actuator may include: a bobbin having therein a through hole where the first lens assembly is mounted; a housing formed to enclose side surfaces of the bobbin; one or more magnetic members provided between the bobbin and the housing; a coil disposed close to the magnetic member, and configured to generate an electromagnetic force between itself and the magnetic member; an upper spring formed on an upper surface of the housing; a lower spring formed on a lower surface of the housing; and a supporting member configured to connect the upper spring with the lower spring.

In an embodiment of the present invention, the supporting member may be formed to pass through the first and second blades, and slits may be formed at the first and second blades for prevention of interference between the first and second blades and the supporting member.

In an embodiment of the present invention, the supporting member may be formed at a plurality of regions of the upper and lower springs, and may be formed as one or more wires.

In an embodiment of the present invention, the upper spring may include: a corner part formed at a bent part; and an edge part formed along an edge of the bobbin.

In an embodiment of the present invention, the edge part may be formed of a metallic material, and may be formed to be bent a plurality of times.

In an embodiment of the present invention, the diaphragm may further include: a fixed member to which at least one end of the first and second blades contacts; and a bush formed to pass through a through hole formed at one end of the first blade or the second blade.

In an embodiment of the present invention, the first lens assembly may be accommodated in the diaphragm, the diaphragm may be accommodated in the actuator, and the actuator may drive the first lens assembly and the diaphragm.

In an embodiment of the present invention, the actuator may include: a carrier provided with a through hole therein, and formed to define an inner space by a side wall; a second magnetic member provided on the side wall of the carrier; a housing formed to accommodate therein the carrier by a side wall, and having a through hole at a region corresponding to the second magnetic member; a second coil provided at an inner region of the through hole of the housing so as to face the second magnetic member, and configured to generate an electromagnetic force; and a printed circuit board configured to supply power to the second coil.

In an embodiment of the present invention, the carrier and the diaphragm may move together with the first lens assembly by an electromagnetic force generated from the second magnetic member and the second coil. First and second guide grooves may be formed on an outer side wall of the carrier and an inner side wall of the housing, in a thickness direction. When the carrier moves, balls may slide in the first and second guide grooves.

In an embodiment of the present invention, the camera module may further include: an infrared ray cut filter (IRCF) disposed below the second lens assembly and configured to shield infrared rays; and an image sensor disposed below the IRCF, and configured to convert an optical signal incident through the first and second lens assemblies into an image signal.

In an embodiment of the present invention, the first and second lens assemblies, the diaphragm and the actuator may be accommodated in the case.

The mobile terminal according to the present invention may have the following advantages.

Firstly, an aperture of the diaphragm may be changed by the motor.

Further, an auto focusing (AF) function may be executed as the lens assembly is moved. That is, the camera module having the diaphragm of which aperture is changeable, may be provided with an AF function.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 10 is an exploded perspective view of the camera module according to a second embodiment of the present invention.

DETAILED DESCRIPTION OF THE INVENTION

Figure 1A:
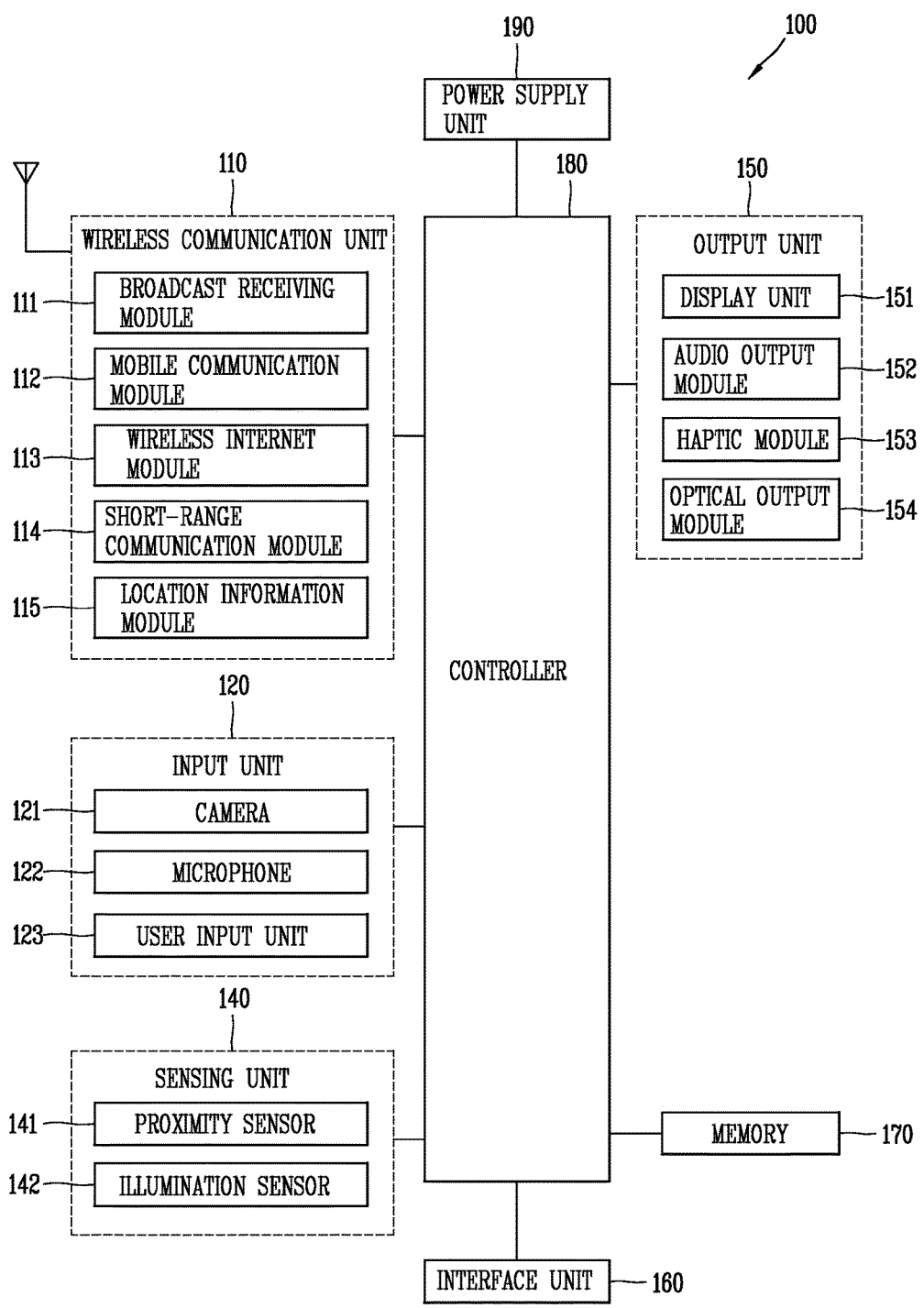
FIG. 1A is a block diagram of a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
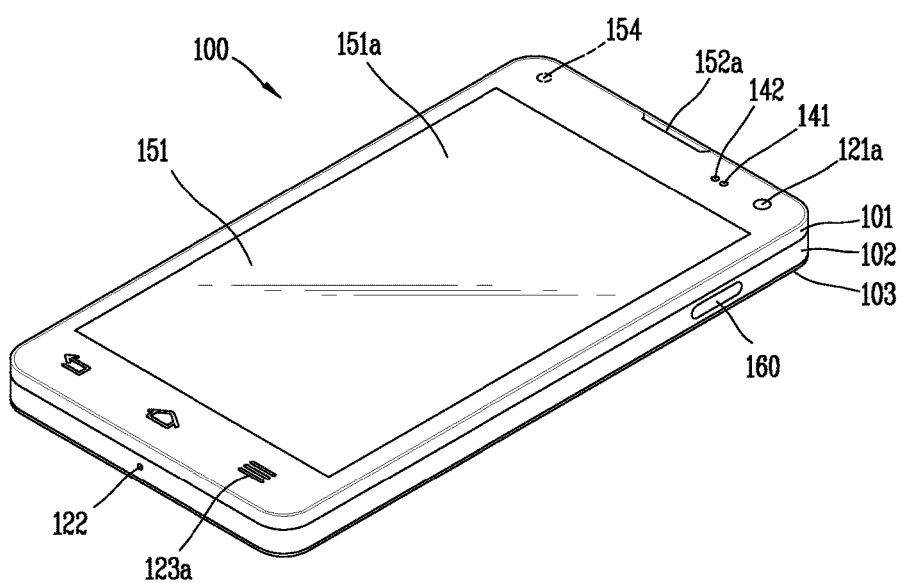
FIGS. 1B and 10 are conceptual views of a mobile terminal of the present invention, which are viewed from different directions.
Figure 1C:
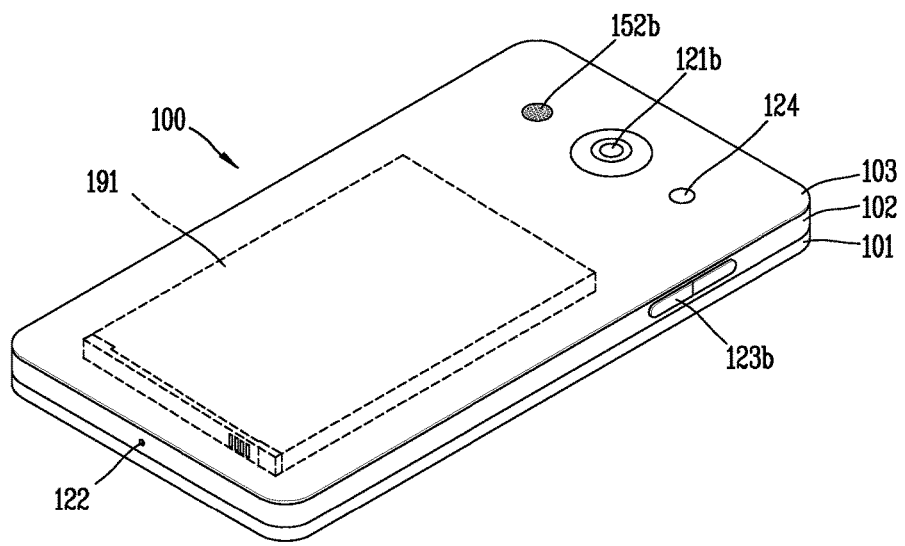

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
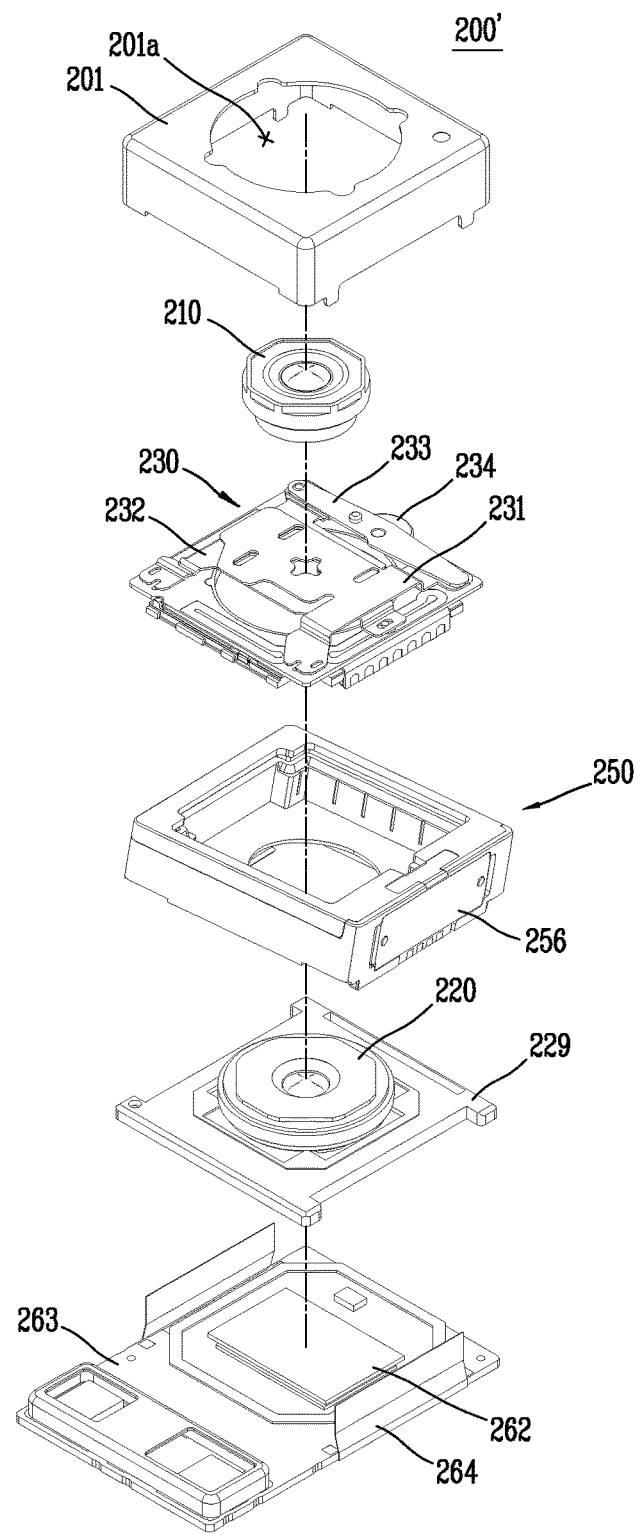

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A first embodiment of the present invention is related to a case where a diaphragm 230 of a camera module 200 used in the mobile terminal 100 is changed. Especially, the first embodiment is related to a case where two lens assemblies 210, 220 are accommodated in lens barrels 210a, 220a, respectively. That is, the first embodiment discloses a camera module having dual barrels.

Generally, an actuator performs an auto focusing function by moving the diaphragm 230 in a thickness direction.

The actuator for generating a driving force may include a voice coil motor (VCM) actuator, an encoder actuator, a piezoelectric (PZT) actuator, and a rotation motor actuator. In the present invention, the camera module 200 adopts a VCM actuator and an encoder actuator. The PZT actuator indicates an actuator driven through deformation of a piezoelectric device when a voltage is applied thereto by using the piezoelectric device.

In this case, the diaphragm 230 may be driven by an electric motor 234. A method to execute an auto focusing (AF) function may be classified into a method according to a first embodiment, and a method according to a second embodiment.

More specifically, the first embodiment relates to a case of executing an AF function by using a voice coil motor (VCM), and the second embodiment relates to a case of executing an AF function by using an encoder. However, this is merely exemplary. That is, the contents of the first and second embodiments may be changeable from each other, or the present invention may be applied to only one of the first and second embodiments. The first embodiment may adopt an encoder actuator, an SMA actuator and an MEMS actuator as well as a VCM actuator, because the first lens assembly 210 is positioned above the diaphragm 230. For convenience, a VCM actuator will be referred to as a first actuator 240. An actuator according to the first embodiment is represented as a VCM actuator, and an actuator according to the second embodiment is represented as an encoder actuator. However, the first actuator 240 according to the first embodiment should not be limited to a VCM actuator, and a second actuator 250 according to the second embodiment should not be limited to an encoder actuator.

A camera module 200 according to a first embodiment of the present invention includes a first lens assembly 210, a second lens assembly 220 provided below the first lens assembly 210, a diaphragm 230 provided between the first and second lens assemblies 210, 220 and having its aperture changed, and an actuator 240, 250 disposed close to the first lens assembly 210 and configured to drive the first lens assembly 210. In the first embodiment of the present invention, two lens assemblies 210, 220 are provided, and the two lens assemblies 210, 220 are spaced apart from each other. For instance, the first lens assembly 210 may be provided at the first lens barrel 210a, and the second lens assembly 220 may be provided at the second lens barrel 220a.

The diaphragm 230 is a diaphragm having its aperture changed. For this, in the first embodiment of the present invention, the diaphragm 230 is driven by the electric motor 234. However, the electric motor 234 may not be provided. That is, the camera module 200 having the two lens assemblies and the diaphragm 230 without the electric motor 234, may be included in the scope of the present invention.

Hereinafter, the first embodiment of the present invention will be explained.

Figure 2:
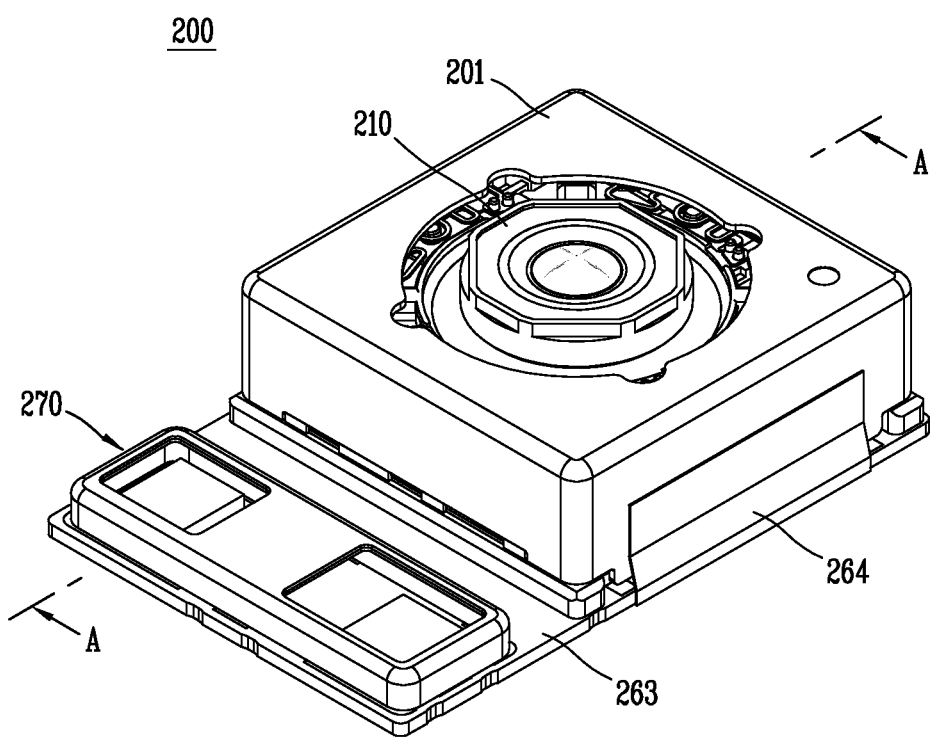
FIG. 2 is a perspective view of a camera module according to a first embodiment of the present invention.
Figure 3:
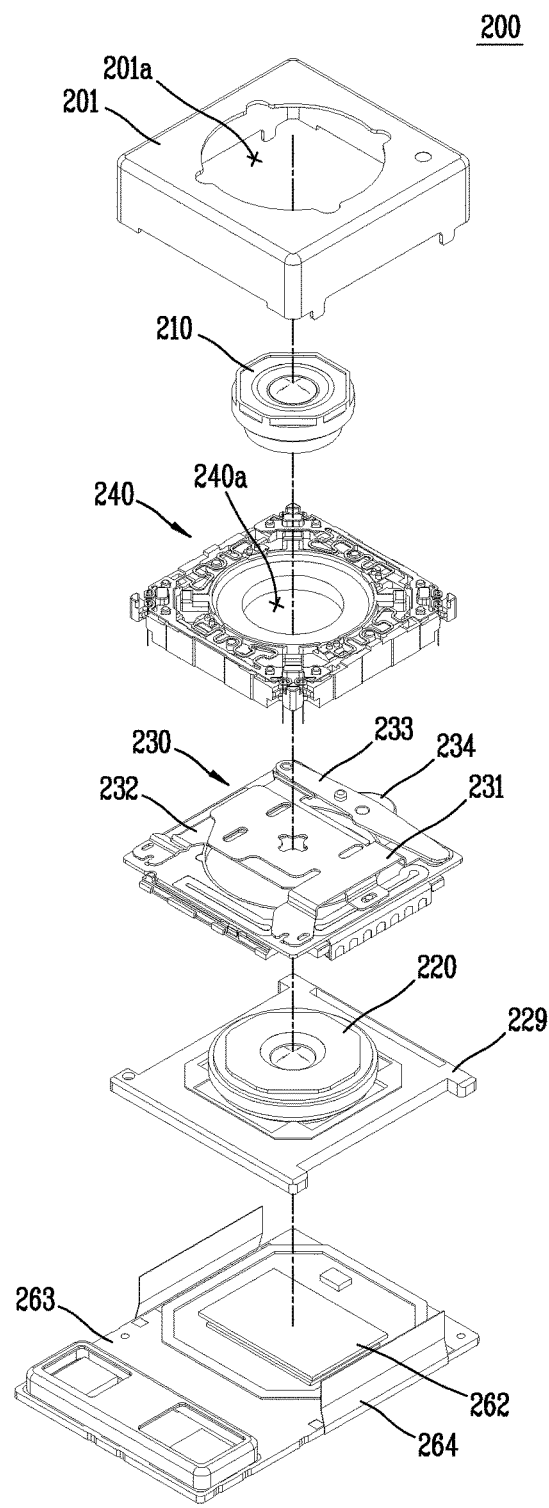
FIG. 3 is an exploded perspective view of FIG. 2.
Figure 4:
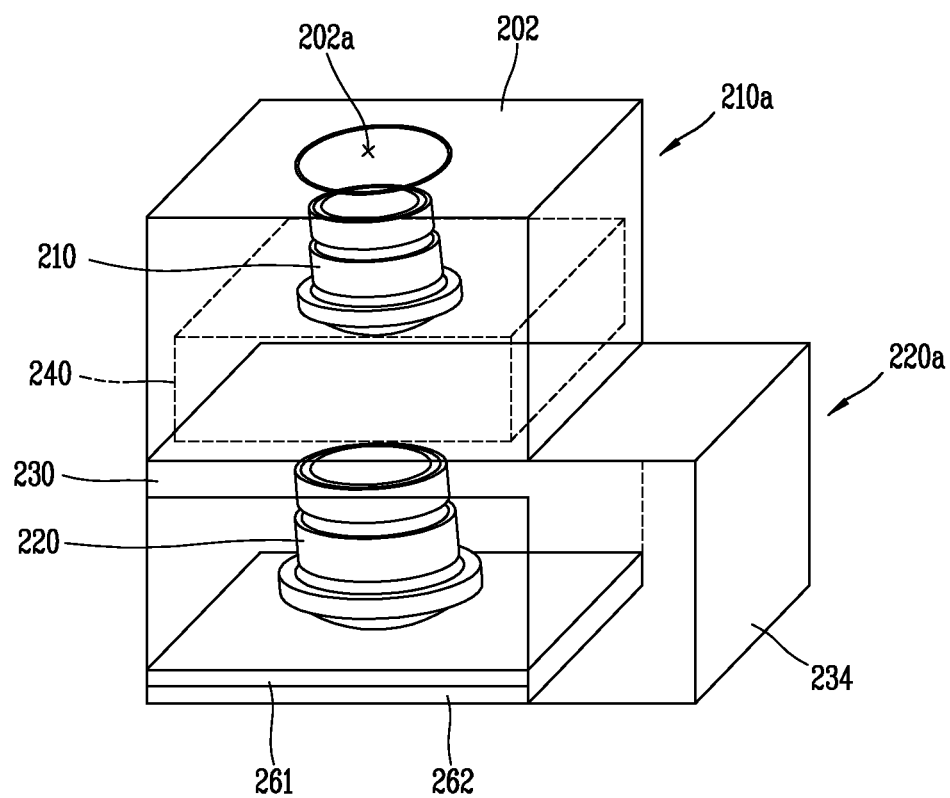
FIG. 4 is a conceptual view of the camera module according to a first embodiment of the present invention.

FIG. 2 is a perspective view of the camera module 200 according to the first embodiment of the present invention, FIG. 3 is an exploded perspective view of FIG. 2, and FIG. 4 is a conceptual view of the camera module 200 according to the first embodiment of the present invention.

The first embodiment to be explained hereinafter discloses the camera module 200 which executes an AF function by the actuator 240 of a voice coil motor (VCM) actuator.

The VCM actuator 240, a small electric motor actuator, is mainly used to micro-control compact electronic equipment owing to a fast responsiveness, a linear characteristic, a small size, and a low power driving thereof. The VCM has a structure where a magnetic circuit is formed by steel and a permanent magnet, and a coil is positioned at an air gap inside the magnetic circuit. In this case, the VCM is operated by the Lorentz force, the combination of electric and magnetic force on a point charge due to electromagnetic fields.

Hereinafter, the VCM actuator 240 will be referred to as the first actuator 240, and an encoder actuator according to a second embodiment to be explained later will be referred to as the second actuator 250.

In case of changing the diaphragm 230 using the electric motor 234, the electric motor 234 should be positioned on a top surface of the camera module 200, due to its large volume. Further, the diaphragm 230 and the electric motor 234 should be reciprocated for an AF function, since the electric motor 234 is formed at one side of the diaphragm 230 as shown in FIG. 4. However, there does not exist the VCM actuator 240 which drives the diaphragm 230 and the electric motor 234 to reciprocate.

For instance, a maximum mass of an object which can be reciprocated by the VCM actuator 240 is about 250 mg, and a total mass of the diaphragm 230 and the electric motor 234 is about 800 mg. This may cause an AF function by the VCM actuator 240 not to be executable. In order to solve such a problem, in the first embodiment, the diaphragm 230 and the electric motor 234 are disposed between the first and second lens assemblies 210, 220. With such a configuration, only the first lens assembly 210 is reciprocated by the first actuator 240, whereas the diaphragm 230 and the electric motor 234 are fixed when an AF function is executed.

That is, the first lens assembly 210 and the first actuator 240 are provided at an upper side, whereas the diaphragm 230 and the second lens assembly 220 are provided at a lower side. And only the first lens assembly 210 is moved when an AF function is executed.

As shown in FIG. 4, the first lens assembly 210 and the first actuator 240 are accommodated in the first lens barrel 210a, and the second lens assembly 220 and the diaphragm 230 are accommodated in the second lens barrel 220a. The first lens barrel 210a may be a case 202 having a through hole 202a, and the second lens barrel 220a may be a case including the electric motor 234. The first and second lens barrels 210a, 220a may be accommodated in the case 201 which forms appearance of the mobile terminal.

Figure 6:
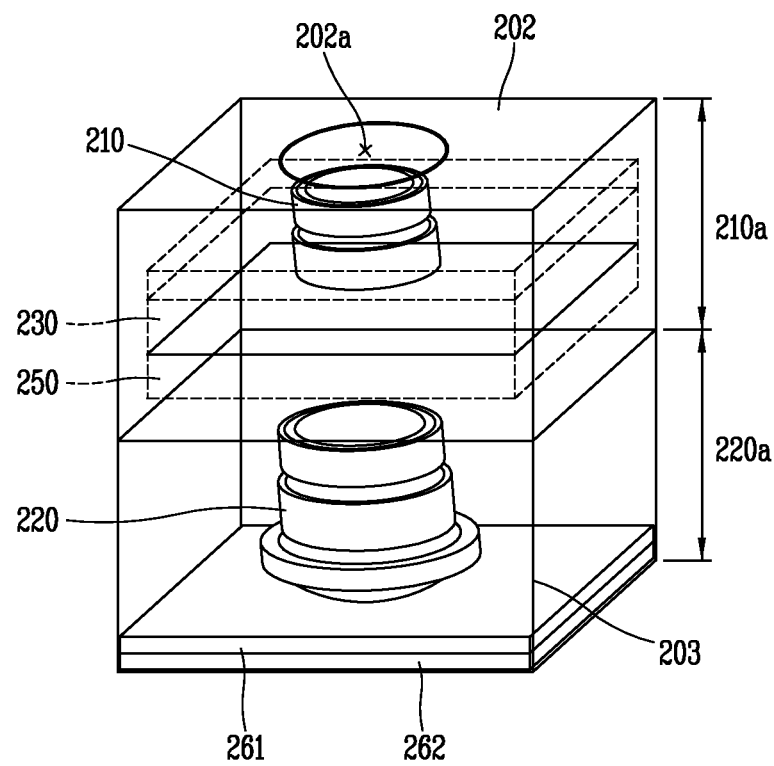
FIG. 6 is an exploded perspective view of a diaphragm according to a first embodiment of the present invention.

FIG. 6 is an exploded perspective view of the diaphragm 230 according to the first embodiment of the present invention. The diaphragm 230 of FIG. 6 may be applicable to all of the first and second embodiments.

Referring to FIG. 6, the diaphragm 230 according to the first embodiment of the present invention includes a first blade 231 having a through hole 231b therein; a second blade 232 having a through hole 232b therein, and configured to change an aperture of the diaphragm 230 by a relative motion with respect to the first blade 231; a link member 233 coupled to end parts of the first and second blades 231, 232, and configured to move the first and second blades 231, 232; and a motor 234 coupled to one side of the link member 233, and configured to rotate the link member 233.

The motor 234 is coupled to one point of the link member 233, and is configured to rotate the link member 233. Since the link member 233 is long formed in one direction and is rotated as coupling portions 231a, 232a of the first and second blades 231, 232 are coupled to two ends thereof, the first and second blades 231,232 are moved in opposite directions. As the first and second blades 231,232 are moved in opposite directions, an aperture of the diaphragm 230 may be controlled. In this case, the link member 233 is rotated clockwise or counterclockwise, and the first and second blades 231, 232 are moved according to a rotation direction.

For instance, if an aperture of the diaphragm 230 is gradually decreased by the first and second blades 231, 232 as the link member 233 is rotated clockwise, the aperture of the diaphragm 230 is gradually increased by the first and second blades 231, 232 as the link member 233 is rotated counterclockwise.

The motor 234 may be coupled to a through hole 233a formed at a middle part of the link member 233. The first blade 231 is provided with a through hole 231b at a middle part thereof, and is provided with the first coupling portion 231a at one side thereof, thereby being coupled to one end of the link member 233. And the second blade 232 is provided with a through hole 232b at a middle part thereof, and is provided with the second coupling portion 232a at one side thereof, thereby being coupled to another end of the link member 233.

The diaphragm 230 further includes a fixed member 236 to which at least one end of the first and second blades 231, 232 contacts, and a bush 237 formed to pass through a through hole 236b formed at one end of the first blade 231 or the second blade 232. A through hole 235a is formed at a stair-stepped portion 235 stair-stepped from a main surface of the second blade 232. The bush 237 passes through the through hole 236b of the fixed member 236 and the through hole 235a of the first blade 231 or the second blade 232, thereby preventing the first blade 231 or the second blade 232 from being separated from the fixed member 236.

A flexible printed circuit board (FPCB) configured to control the diaphragm 230, and a supporting plate 238 are formed below the fixed member 236.

FIG. 6 illustrates that the through hole 235a is formed at the second blade 232. However, the present invention is not limited to this. That is, the through hole 235a may be formed at the first blade 231, or may be formed at both of the first and second blades 231,232. If the through hole 235a is formed at both of the first and second blades 231,232, the through hole 236b should be formed in one pair such that two bushes 237 pass through the first and second blades 231, 232, respectively. The bush 237 passes through the through hole 236b, and a movement of the first and second blades 231, 232 may be restricted by the through hole 236b. In the first embodiment of the present invention, the bush 237 is formed as a slit, such that a space where the bush 237 is moveable in the through hole 236b is obtainable. Accordingly, the first and second blades 231,232 are reciprocated without interference with the bush 237.

Figure 5:
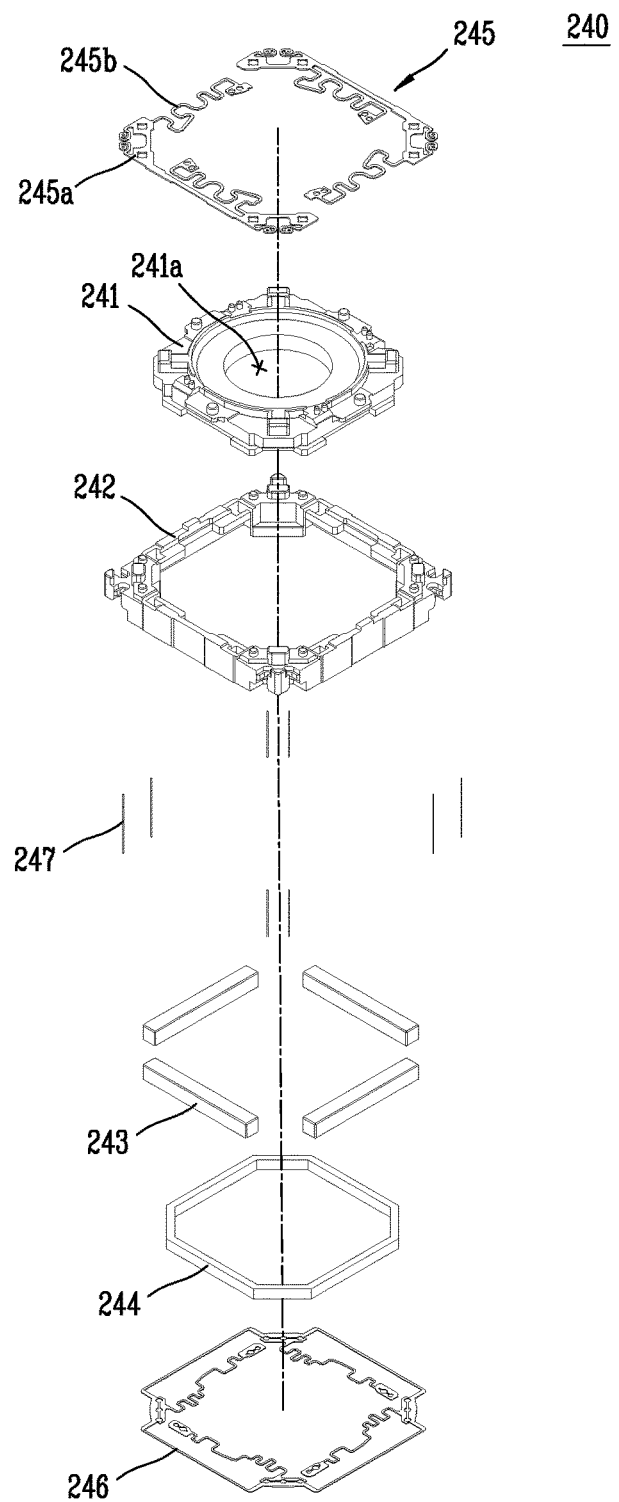
FIG. 5 is an exploded perspective view of a first actuator according to a first embodiment of the present invention.

FIG. 5 is an exploded perspective view of a first actuator 240 according to the first embodiment of the present invention.

Referring to FIG. 5, the first actuator 240 according to the first embodiment of the present invention includes a bobbin 241 having therein a through hole 241a where the first lens assembly 210 is mounted, a housing 242 formed to enclose side surfaces of the bobbin 241, one or more first magnetic members 243 provided between the bobbin 241 and the housing 242, a first coil 244 disposed close to the first magnetic member 243 and configured to generate an electromagnetic force between itself and the first magnetic member 243, an upper spring 245 formed on an upper surface of the housing 242, a lower spring 246 formed on a lower surface of the housing 242, and a supporting member 247 configured to connect the upper spring 245 with the lower spring 246.

Referring to FIG. 5, the first magnetic member 243 is formed in four, and the first coil 244 is formed to have a shape corresponding to that of the bobbin 241. In FIG. 5, the bobbin 241 and the housing 242 are formed to have a quadrangular shape, but may be formed to have a polygonal shape or a circular shape.

Figure 8:
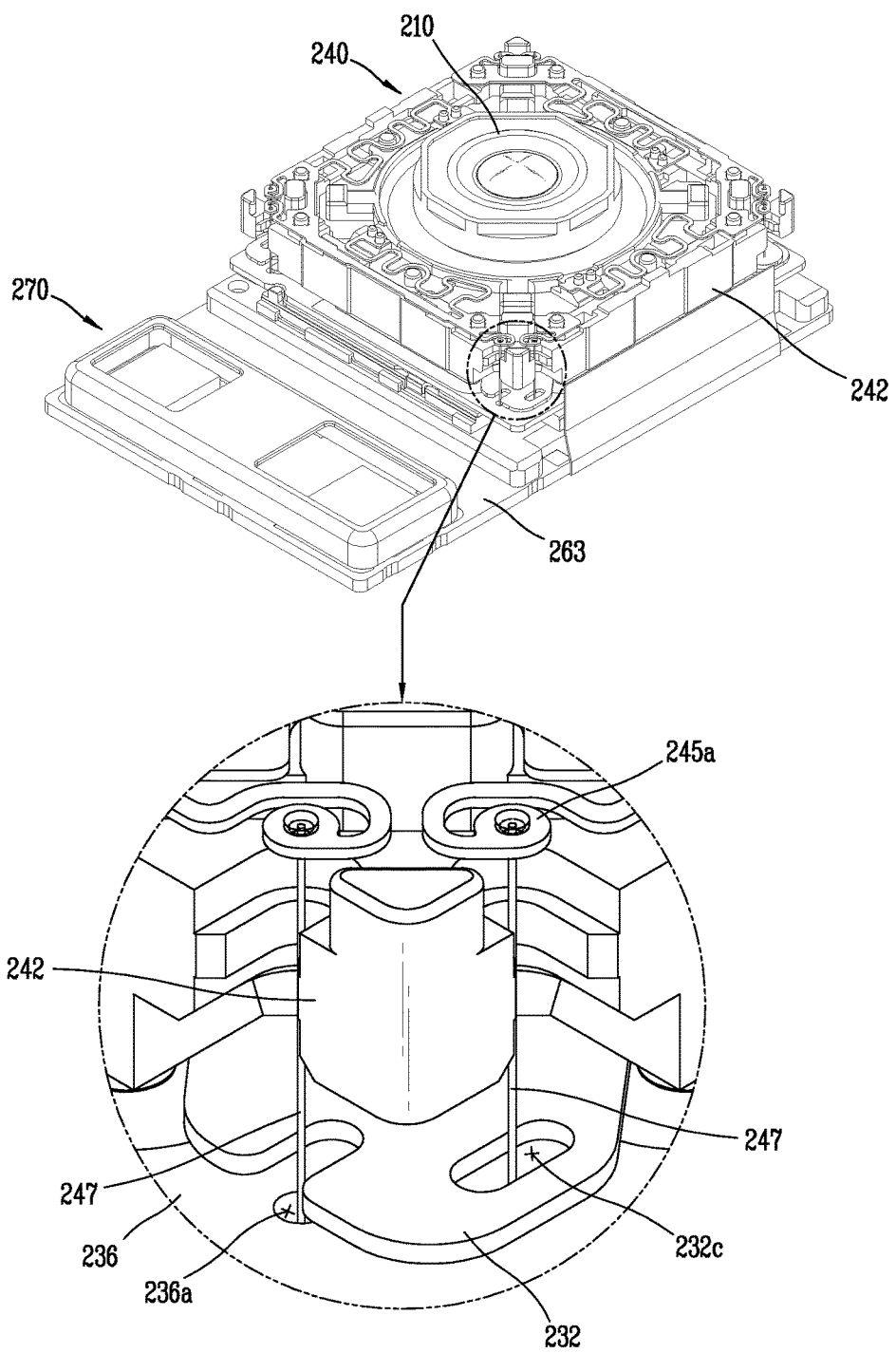
FIG. 8 is a sectional view taken along line 'AA' in FIG. 2.

FIG. 8 is a sectional view taken along line 'AA' in FIG. 2.

Referring to FIG. 8, the first magnetic member 243 and the first coil 244 are disposed close to each other, and the housing 242 is formed outside the first magnetic member 243.

The supporting member 247 may be formed at a plurality of regions of the upper and lower springs 245, 246, and may be formed as one or more wires. In the first embodiment of the present invention, the supporting member 247 is formed at corners of the bobbin 241 as two wires. An upper end of the supporting member 247 may be coupled to the upper spring 245, and a lower end of the supporting member 247 may be coupled to the lower spring 246. With such a configuration, an upward movement of the bobbin 241 is restricted by the upper spring 245, and a downward movement of the bobbin 241 is restricted by the lower spring 246.

Hereinafter, coupling of the supporting member 247 will be explained in more detail.

Figure 7:
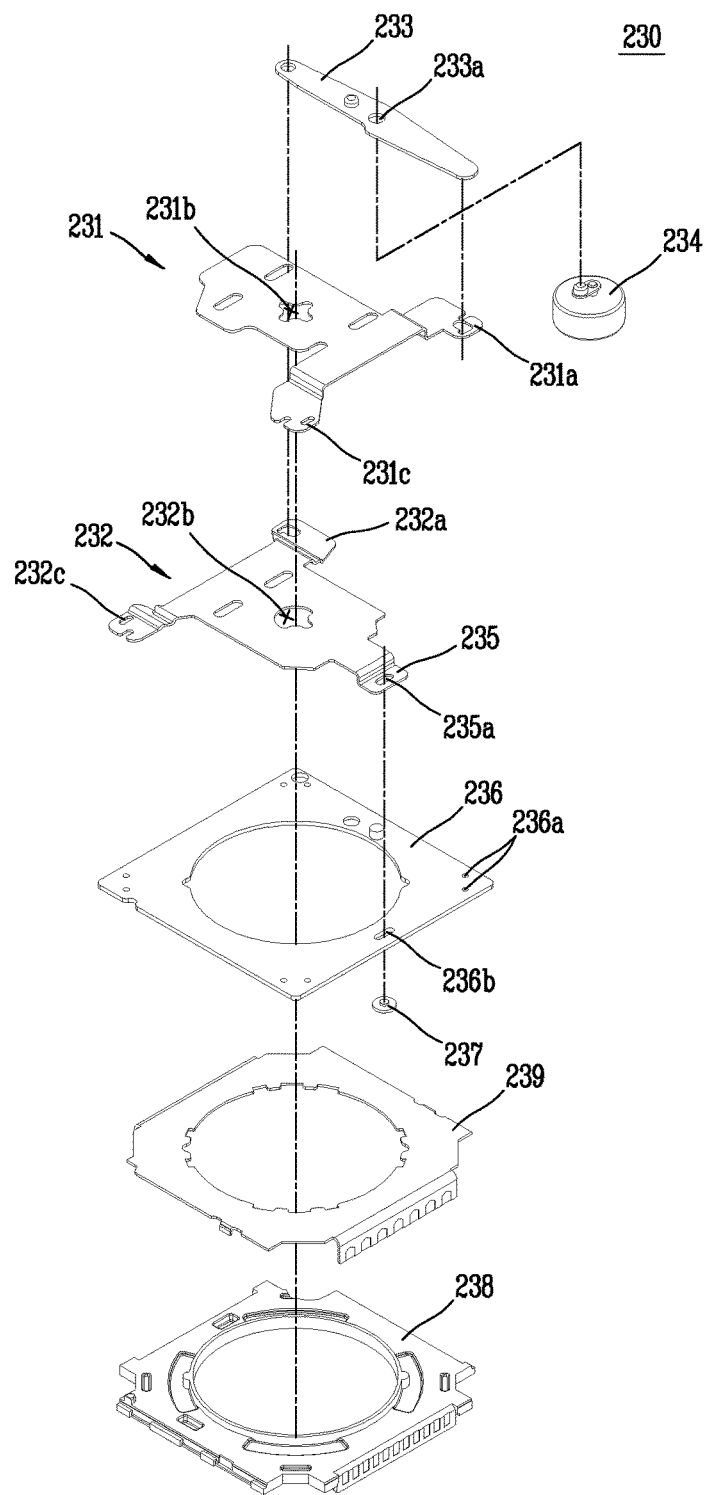
FIG. 7 is a perspective view and a partial enlargement view illustrating a state where a case has been removed from the camera module according to a first embodiment of the present invention.

FIG. 7 is a perspective view and a partial enlargement view illustrating a state where the case 201 has been removed from the camera module according to the first embodiment of the present invention. Hereinafter, the present invention will be explained with reference to FIGS. 7 and 5.

The upper spring 245 is formed of an elastic material, and is divided into two parts in an approximate 'L' shape as shown. However, the present invention is not limited to this. That is, the upper spring 245 may be formed as a single body. This may be also applied to the lower spring 246. FIG. 5 illustrates that the upper spring 245 is divided into two parts, and the lower spring 246 is formed as a single body. In the case where the upper spring 245 is divided into two parts, each end thereof should be coupled to the bobbin 241 or the housing 242.

The upper spring 245 includes a corner part 245a formed at a bent part, and an edge part 245b formed along an edge of the bobbin 241. The corner part 245a may be provided with a through hole such that the supporting member 247 may be coupled thereto. And the edge part 245b is formed to have a zigzag shape for elasticity. That is, the corner part 245a to which the supporting member 247 is coupled is a region where an elastic transformation scarcely occurs, whereas the edge part 245b is a region where an elastic transformation occurs by a movement of the bobbin 241. Accordingly, the upper spring 245 may be formed to have a shape that a metallic wire is bent a plurality of times.

Since the first actuator 240 is a VCM actuator, the first magnetic member 243 and the first coil 244 are provided. The bobbin 241 is moved up and down (or back and forth) by the first actuator 240. As the bobbin 241 is moved, the first lens assembly 210 accommodated in one surface of the bobbin 241 is moved. That is, in the first embodiment of the present invention, when an AF function is executed, only the first lens assembly 210 and the bobbin 241 are moved while the remaining components are fixed. In this case, the first lens assembly 210 is mounted to a middle region of the first actuator 240 where the through hole 240a is formed.

The second lens assembly 220 is mounted to a lens supporting plate 229.

The bobbin 241 may reciprocate by an electromagnetic force generated from the first magnetic member 243 and the first coil 244 of the first actuator 240.

The supporting member 247 is formed to pass through the first and second blades 231, 232, and slits 231c, 232c are formed at the first and second blades 231, 232 for prevention of interference between the first and second blades 231, 232 and the supporting member 247. This will be explained in more detail with reference to FIGS. 6 and 7.

Referring to FIG. 7, the supporting member 247 formed of a pair of wires is formed at each of four corners of the bobbin 241. The supporting member 247 is formed to pass through a through hole 232c of the second blade 232 and a through hole 236a of the fixed member 236. Since the second blade 232 is moveable, the through hole 232c should be formed as a slit such that the supporting member 247 does not hinder a horizontal movement of the second blade 232. In case of the first blade 231, a through hole 231c (refer to FIG. 6) is formed as a slit not to hinder a movement of the supporting member 247. However, the through hole 236a may be formed to have any other type rather than a slit, since the fixed member 236 is not moved.

In the second embodiment of the present invention, used is the encoder actuator 250 capable of moving an object heavier than that by the VCM actuator 240. That is, in case of changing an aperture of the diaphragm 230 by the motor 234, the second actuator 250 may move the diaphragm 230, the motor 234 and the first lens assembly 210.

Figure 9:
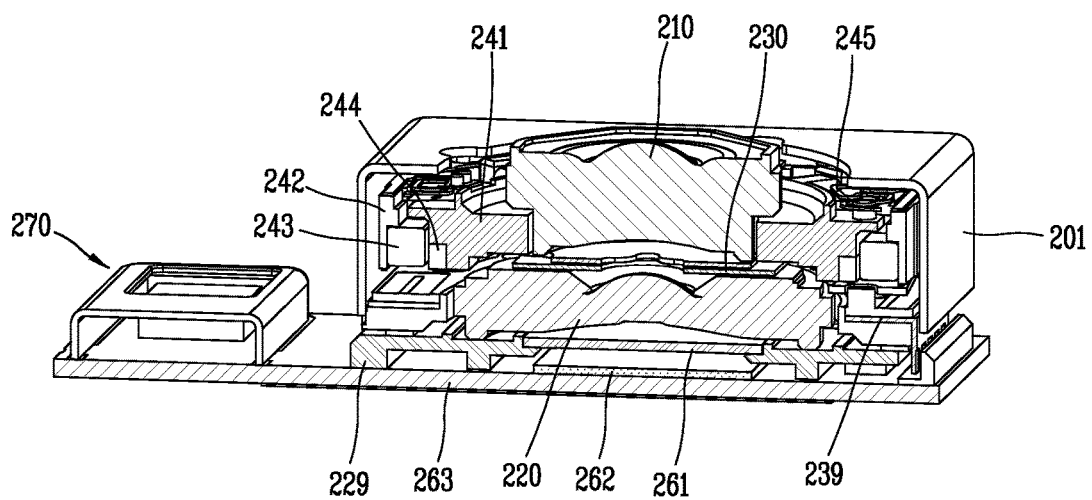
FIG. 9 is a conceptual view of a camera module according to a second embodiment of the present invention.

FIG. 9 is a conceptual view of a camera module 200' according to the second embodiment of the present invention.

Referring to FIG. 9, in the second embodiment of the present invention, the second actuator 250 is disposed below the diaphragm 230, and the diaphragm 230, the motor 234 and the first lens assembly 210 are reciprocated by the second actuator 250 when an AF function is executed by a movement of the first lens assembly 210. Hereinafter, features of the second embodiment which are differentiated from those of the first embodiment will be explained. However, the descriptions aforementioned in the first embodiment may be also applied to the second embodiment.

In the second embodiment of the present invention, the first lens assembly 210, the diaphragm 230 and the second actuator 250 may be formed at an upper part of the camera module 200', and the second lens assembly 220 may be formed at a lower part of the camera module 200'. The components formed at the upper part of the camera module 200' are accommodated in the first lens barrel 210a, and the components formed at the lower part of the camera module 200' are accommodated in the second lens barrel 220a. That is, the first lens barrel 210a serves to accommodate the first lens assembly 210 therein, and the second lens barrel 220a serves to accommodate the second lens assembly 220 therein.

In this case, the first lens barrel 210a may be the upper case 202 having the through hole 202a therein, and the second lens barrel 220a may be a lower case 203 formed below the upper case 202. The upper case 202 and the lower case 203 may be accommodated in the case 201.

FIG. 10 is an exploded perspective view of the camera module 200' according to the second embodiment of the present invention.

Referring to FIG. 10, the diaphragm 230 is accommodated in the second actuator 250, and the diaphragm 230 and the first lens assembly 210 are moveable by the second actuator 250.

The camera module 200 according to the first embodiment of the present invention further includes an infrared ray cut filter (IRCF) 261 disposed below the second lens assembly 220 and configured to shield infrared rays, an image sensor 262 disposed below the IRCF 261 and configured to convert an optical signal incident through the first and second lens assemblies 210, 220 into an image signal, and a first printed circuit board (PCB) 263 where the image sensor 262 is mounted. The IRCF 261, the image sensor 262 and the first PCB 263 may be accommodated in the second lens barrel 220a. The first PCB 263 is electrically connected to a main PCB inside the mobile terminal 100 by a connector 270. An insulating tape 264 may be formed outside the first PCB 263, thereby forming appearance of the camera module 200,200' (refer to FIGS. 2, 3 and 10).

The image sensor 262 converts an optical signal incident through the first lens assembly 210, the diaphragm 230, the second lens assembly 220 and the IRCF 261, into an electric signal. In this case, a charge coupled device (CCD) or a complementary metal oxide semiconductor (CMOS) may be used as the image sensor 262.

The IRCF 261 is disposed between the diaphragm 230 and the image sensor 262. And the IRCF 261 is configured to pass visible rays among light incident from the outside therethrough, but to prevent infrared rays from reaching the image sensor 262.

Figure 11:
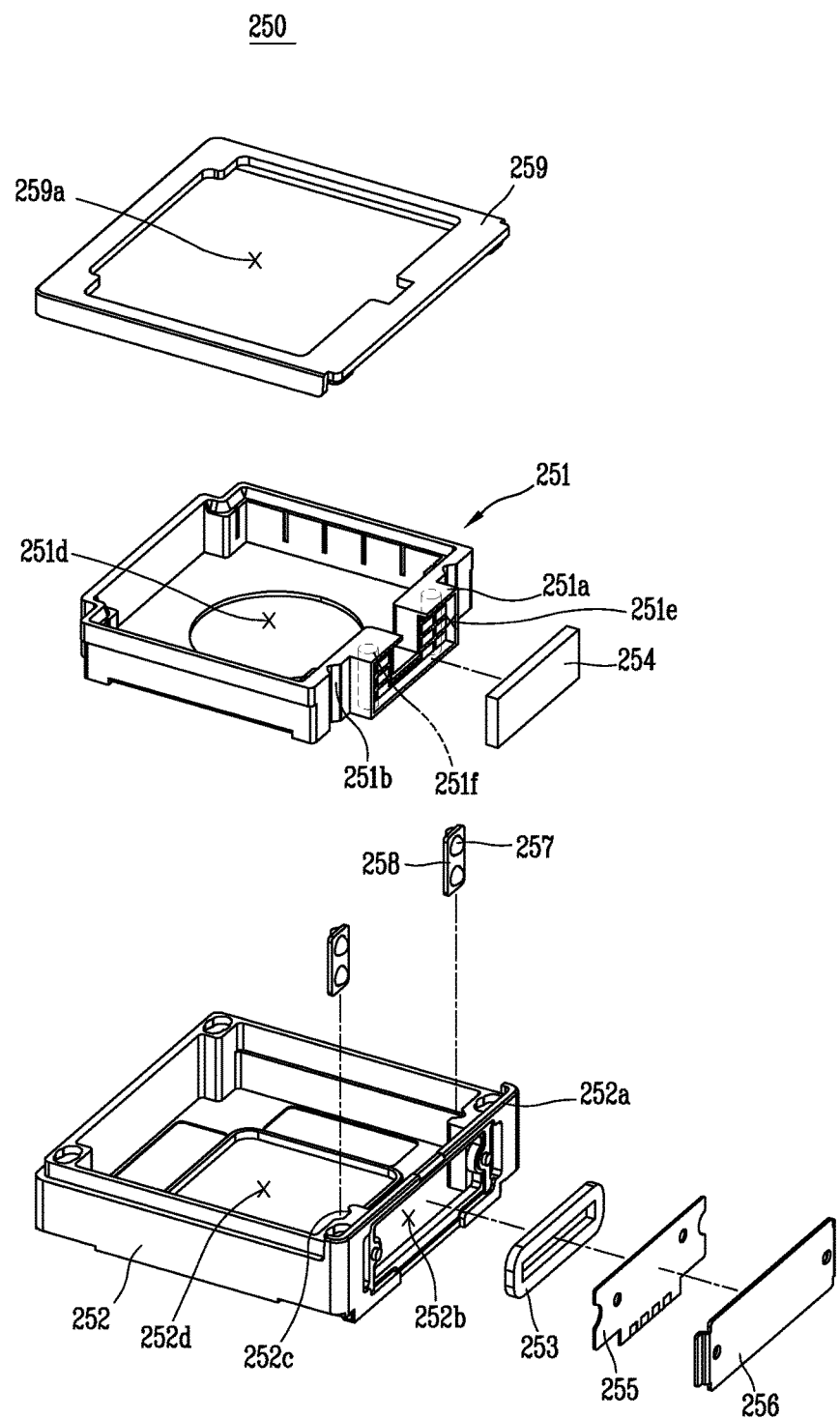
FIG. 11 is an exploded perspective view of a second actuator according to a second embodiment of the present invention.

FIG. 11 is an exploded perspective view of the second actuator 250 according to the second embodiment of the present invention.

Referring to FIG. 11, the second actuator includes a carrier 251, a second magnetic member 254, a housing 252, a second coil 253 and a second printed circuit board (PCB) 255. The carrier 251 is provided with a through hole 251d therein, and is formed to define an inner space by a side wall 251a. The carrier 251 accommodates therein the diaphragm 230 and the first lens assembly 210, and controls the diaphragm 230 and the first lens assembly 210 to reciprocate. The second magnetic member 254 is provided on one outer side surface of the carrier 251, and the second coil 253 is provided at an inner region of a through hole 252b formed at a side wall 252a of the housing 252. The second coil 253 is disposed to face the second magnetic member 254, and generates an electromagnetic force to move the carrier 251. The carrier 251 performs the same function as the bobbin 241 according to the first embodiment. That is, the bobbin 241 and the carrier 251 are configured to move the first lens assembly 210.

The housing 252 is formed to accommodate the carrier 251 therein by the side wall 252a, and is provided with the through hole 252b at a region corresponding to the second magnetic member 254. The second PCB 255 configured to supply power to the second coil 253 is disposed close to the second coil 253. The second coil 253 and the second magnetic member 254 may be called a driving unit, because they are configured to move the carrier 251 by generating an electromagnetic force. And the second PCB 255 may be called a PCB for actuator because it controls the second actuator 250.

A guide hole 251f is formed at a protruding region of the side wall 251a, and a protrusion (not shown) of a pillar shape formed at the housing 252 is inserted into the guide hole 251f. With such a configuration, the carrier 251 may be coupled to the housing 252 in a slidable manner.

The carrier 251 and the housing 252 have similar shapes, parallelepiped shapes by which upper surfaces thereof are open and lower surfaces are provided with through holes 251d, 252d, respectively. That is, the carrier 251 has four side walls 251a, and is provided with the through hole 251d at a lower surface thereof. And the housing 252 has four side walls 252a, and is provided with the through hole 252d at a lower surface thereof. In this case, the through hole 251d may be formed to be smaller than the through hole 252d. The side wall 252a of the housing 252 is formed to be covered by a housing cover 259, and the housing cover 259 is provided with a through hole 259b. The through hole 259b is formed such that the diaphragm 230 is exposed to the outside therethrough.

Guide grooves 251b, 252c are formed in upper and lower directions, at one side of a region where the second magnetic member 254 is provided. The guide grooves 251b,252c provide a space where balls 257 are slidable. The first guide groove 251b of the guide grooves 251b, 252c is formed on an outer surface of the side walls 251a of the carrier 251, and the second guide groove 252c of the guide grooves 251b, 252c is formed on an inner surface of the side walls 252a of the housing 252. And the first and second guide grooves 251b, 252c are formed to face each other. As the balls 257 and a ball housing 258 slide on the first and second guide grooves 251b, 252c, a frictional force may be minimized when the carrier 251 is reciprocated. The balls 257 may be formed in at least two.

That is, the carrier 251 and the diaphragm 230 are moved together with the first lens assembly 210 by an electromagnetic force generated from the second magnetic member 254 and the second coil 253. In this case, the second magnetic member 254 may be provided at the carrier 251, and the second coil 253 may be provided at the housing 252. Here, since the second magnetic member 254 is moved together with the carrier 251, the second magnetic member 254 is a moving magnet.

The second magnetic member 254 may be provided at a second magnetic member accommodation portion 251e recessed from the carrier 251, such that at least part of the second magnetic member 254 may be overlapped with the side walls 251a of the carrier 251. If the second magnetic member 254 is overlapped with the side walls 251a of the carrier 251, a width of the camera module 200, 200' may be reduced.

A yoke 256 of a plate shape is provided outside the second PCB 255, so as to cover the through hole 252b of the housing 252. The yoke 256 is used to increase an electromagnetic force by preventing the electromagnetic force from being discharged to the outside, and may be formed of a metallic material.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a terminal body; and
   a camera module located at one side of the terminal body, wherein the camera module includes:
   a first lens assembly;
   a second lens assembly located below the first lens assembly;
   a diaphragm located between the first lens assembly and the second lens assembly, and being shaped to have an aperture; and
   an actuator configured to provide reciprocal movement of the first lens assembly relative to the second lens assembly,
   wherein the diaphragm includes:
   a first blade shaped to define a hole;
   a second blade shaped to define a hole and being configured to change the aperture of the diaphragm according to relative motion with respect to the first blade;
   a link member coupled to respective end parts of the first blade and the second blade, and configured to move the first blade and the second blade according to rotation of the link member; and
   a motor coupled to one side of the link member and being configured to cause the rotation of the link member,
   wherein the actuator includes:
   a bobbin shaped to define a region within which the first lens assembly is located;
   a housing formed to enclose side surfaces of the bobbin;
   one or more magnetic members provided between the bobbin and the housing;
   a coil located proximate to the one or more magnetic members, and being configured to generate an electromagnetic force between the coil and the one or more magnetic members;
   an upper spring formed on an upper surface of the housing;
   a lower spring formed on a lower surface of the housing; and
   a supporting member configured to connect the upper spring with the lower spring.

2. The mobile terminal of claim 1, wherein the supporting member is positioned to pass through the hole of the first blade and the hole of the second blade, and slits are formed at the first and second blades for preventing interference between the supporting member and the first and second blades.

3. The mobile terminal of claim 1, wherein the supporting member is positioned at a plurality of regions of the upper and lower springs, and is formed using one or more wires.

4. The mobile terminal of claim 1, wherein the upper spring includes:
   a corner part formed at a bent part; and
   an edge part formed along an edge of the bobbin.

5. The mobile terminal of claim 4, wherein the edge part is formed of a metallic material and is bent.

6. The mobile terminal of claim 1, wherein the diaphragm further includes:
   a fixed member for contacting at least one end of the first and second blades; and
   a bush formed to pass through a hole formed at one end of the first blade or the second blade.

7. The mobile terminal of claim 1, wherein the diaphragm is sized to receive the first lens assembly and the actuator is sized to receive the diaphragm, and
   wherein the actuator drives the first lens assembly and the diaphragm.

8. The mobile terminal of claim 1, wherein the camera module further includes:
   an infrared ray cut filter (IRCF) located below the second lens assembly and configured to shield infrared rays; and
   an image sensor located below the IRCF, and configured to convert an optical signal incident through the first and second lens assemblies into an image signal.

9. The mobile terminal of claim 1, wherein the first and second lens assemblies, the diaphragm, and the actuator are accommodated in the case.

10. A mobile terminal, comprising:
    a terminal body; and
    a camera module located at one side of the terminal body, wherein the camera module includes:
    a first lens assembly;

a second lens assembly located below the first lens assembly;
a diaphragm located between the first lens assembly and the second lens assembly, and being shaped to have an aperture; and
an actuator configured to provide reciprocal movement of the first lens assembly relative to the second lens assembly,
wherein the diaphragm includes:
a first blade shaped to define a hole;
a second blade shaped to define a hole and being configured to change the aperture of the diaphragm according to relative motion with respect to the first blade;
a link member coupled to respective end parts of the first blade and the second blade, and configured to move the first blade and the second blade according to rotation of the link member; and
a motor coupled to one side of the link member and being configured to cause the rotation of the link member,
wherein the diaphragm is sized to receive the first lens assembly and the actuator is sized to receive the diaphragm, and
wherein the actuator drives the first lens assembly and the diaphragm, and
wherein the actuator includes:
a carrier shaped to define a hole, and being formed to define an inner space by a side wall;
a second magnetic member located on the side wall of the carrier;
a housing sized to receive the carrier by a side wall, and shaped to define a hole at a region corresponding to the second magnetic member;
a second coil located at an inner region of the hole of the housing and facing the second magnetic member, and configured to generate an electromagnetic force; and
a printed circuit board configured to supply power to the second coil.

11. The mobile terminal of claim 10, wherein the carrier and the diaphragm move together with the first lens assembly according to an electromagnetic force generated by the second magnetic member and the second coil,
wherein first and second guide grooves are respectively formed on an outer side wall of the carrier and an inner side wall of the housing, in a thickness direction, and
wherein when the carrier moves, balls slide in the first and second guide grooves.

* * * * *